(12) United States Patent
Shindo

(10) Patent No.: US 9,591,180 B2
(45) Date of Patent: Mar. 7, 2017

(54) IMAGE PROCESSING APPARATUS, IMAGE PROCESSING METHOD, AND NON-TRANSITORY COMPUTER-READABLE MEDIUM

(71) Applicant: CANON KABUSHIKI KAISHA, Tokyo (JP)

(72) Inventor: Yukihiro Shindo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 14/058,615

(22) Filed: Oct. 21, 2013

(65) Prior Publication Data
US 2014/0118792 A1     May 1, 2014

(30) Foreign Application Priority Data

Oct. 26, 2012 (JP) .................................. 2012-237272

(51) Int. Cl.
*H04N 1/38* (2006.01)
*H04N 1/407* (2006.01)
(52) U.S. Cl.
CPC .................................. *H04N 1/407* (2013.01)
(58) Field of Classification Search
CPC .................................................... H04N 1/407
USPC .......... 358/3.26, 1.9; 382/173, 190; 348/239
See application file for complete search history.

(56) References Cited

U.S. PATENT DOCUMENTS

2006/0120590 A1   6/2006  Han et al.
2007/0247649 A1*  10/2007 Kanematsu et al. ........... 358/1.9

FOREIGN PATENT DOCUMENTS

| CN | 101354550 A | 1/2009 |
| CN | 100541341 C | 9/2009 |
| JP | 2001-080112 A | 3/2001 |
| JP | 2004-320256 A | 11/2004 |
| JP | 2006-295624 A | 10/2006 |

OTHER PUBLICATIONS

Chinese office action issued in corresponding application No. 201310511650.8 on Jan. 26, 2016.
Chinese Office Action issued in corresponding application No. 201310511650.8 on Dec. 2, 2016.

* cited by examiner

*Primary Examiner* — Quang N Vo
(74) *Attorney, Agent, or Firm* — Carter, DeLuca, Farrell & Schmidt, LLP

(57) ABSTRACT

An image processing apparatus for processing image data to be used for image formation, comprises: a black background area determination unit configured to determine a black background area formed from a plurality of black lines using the number of consecutive black lines and the number of consecutive lines adjacent to the black lines and other than the black lines out of the image data; and a thinning processing unit configured to perform thinning processing for the black background area by switching a thinning pattern to convert a value of a pixel based on the number of lines included in the black background area determined by the black background area determination unit.

9 Claims, 17 Drawing Sheets

FIG. 11A

BLACK BACKGROUND AREA (BkAreaFlag = True)

| BkLineCnt | Pattern | ApplyLine | EdgeLine |
|---|---|---|---|
| 3Line | - | 0Line | 0Line |
| 4Line | - | 0Line | 0Line |
| 5Line | PatternA | 1Line | 1Line |
| 6Line | PatternA | 1Line | 1Line |
| ... | ... | ... | ... |

FIG. 11B

NON-BLACK BACKGROUND AREA (BkAreaFlag = False)

| BkLineCnt | Pattern | ApplyLine | EdgeLine |
|---|---|---|---|
| 3Line | PatternA | 1Line | 1Line |
| 4Line | PatternA | 2Line | 1Line |
| 5Line | PatternB | 2Line | 1Line |
| 6Line | PatternB | 3Line | 1Line |
| ... | ... | ... | ... |

F I G. 12
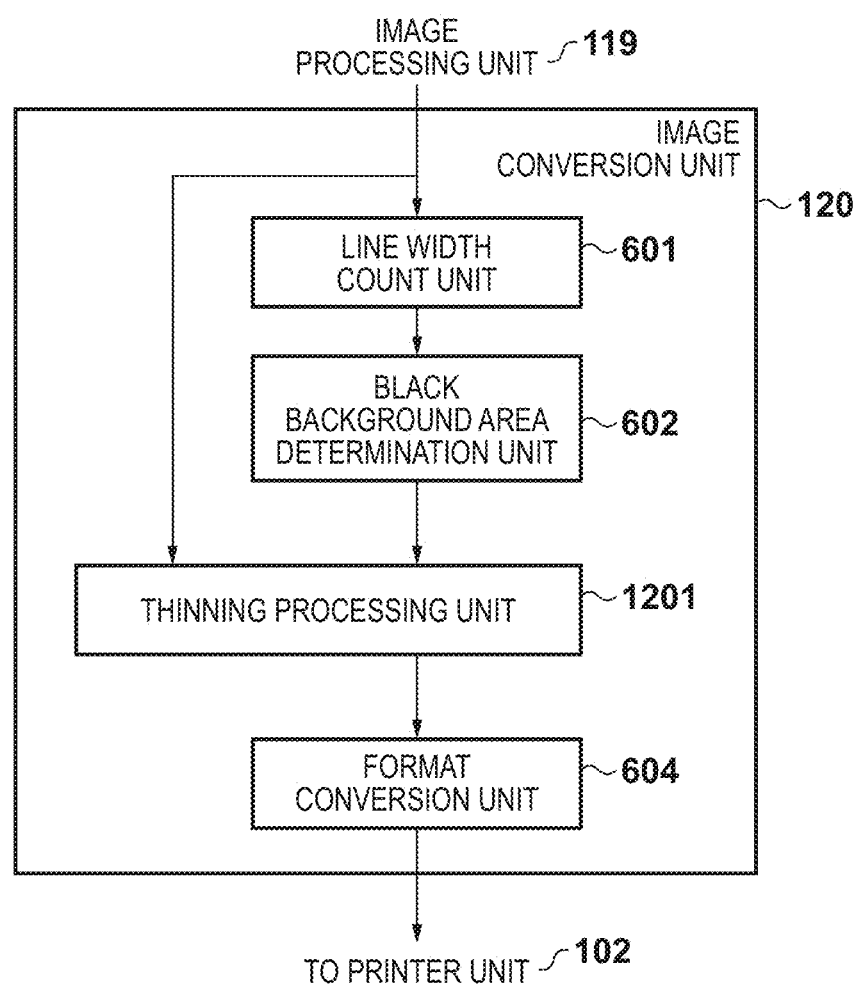

FIG. 17A

Steam ≤ Level1

| BkLineCnt | Pattern | ApplyLine | EdgeLine |
|---|---|---|---|
| 3Line | - | 0Line | 0Line |
| 4Line | - | 0Line | 0Line |
| 5Line | PatternA | 1Line | 1Line |
| 6Line | PatternA | 1Line | 1Line |
| ... | ... | ... | ... |

FIG. 17B

Level1 < Steam < Level2

| BkLineCnt | Pattern | ApplyLine | EdgeLine |
|---|---|---|---|
| 3Line | PatternA | 1Line | 1Line |
| 4Line | PatternA | 1Line | 1Line |
| 5Line | PatternA | 1Line | 1Line |
| 6Line | PatternA | 1Line | 1Line |
| ... | ... | ... | ... |

FIG. 17C

Steam ≥ Level2

| BkLineCnt | Pattern | ApplyLine | EdgeLine |
|---|---|---|---|
| 3Line | PatternA | 1Line | 1Line |
| 4Line | PatternA | 2Line | 1Line |
| 5Line | PatternB | 2Line | 1Line |
| 6Line | PatternB | 3Line | 1Line |
| ... | ... | ... | ... |

IMAGE PROCESSING APPARATUS, IMAGE PROCESSING METHOD, AND NON-TRANSITORY COMPUTER-READABLE MEDIUM

BACKGROUND OF THE INVENTION

Field of the Invention

The present invention relates to an image processing apparatus, an image processing method, and a non-transitory computer-readable medium and, more particularly, to image processing of controlling the applied amount of a color material.

Description of the Related Art

An image forming apparatus generates pixel information from print data and forms an image while controlling the toner amount based on an image signal generated based on the pixel information. If the amount of toner applied at the time of development of image formation is large, that is, the toner applied amount is large, the toner may be not completely fixed and spatter, or come off concerning portions of high dot density. These problems arise at different frequencies depending on the environment where the image processing apparatus is placed (ambient conditions such as the humidity and temperature) and the printing medium type such as paper or sheet.

When printing a straight line in the main-scanning direction, toner may spatter backward in the sub-scanning direction of a line 202 printed on a transfer material (printing medium) 201 and disturb the image, as shown in FIG. 2. This will be described with reference to FIG. 3. When passing through a fixing unit 301 incorporating a heater of high temperature, the transfer material 201 is suddenly heated, and water in it changes to steam 302 and comes out. At this time, if toner 303 is applied thin and high, it is overwhelmed by the steam 302 from the transfer material 201 and blown off backward in the conveyance direction. The phenomenon that the toner spatters and disturbs the image will be referred to as a "tailing-blur phenomenon".

A conventional measure against the tailing-blur phenomenon is to decrease the toner applied amount. More specifically, toner is thinned with respect to dots of image data subjected to image formation. For the conventional method, however, a problem of degradation in image quality has been pointed out. In particular, the degree of tailing-blur phenomenon changes depending on the ambient conditions or printing medium type. Hence, when the toner thinning rate is raised in accordance with the degree of tailing-blur phenomenon until it is completely eliminated, the image degrades due to thinning of lines, a decrease in the density, or missing of an image. To prevent this, there is proposed a method of executing thinning processing only for a line width to cause the tailing-blur phenomenon and suppressing the thinning amount not to make image degradation unnoticeable (for example, see Japanese Patent Laid-Open No. 2001-80112).

In this related art, however, since the thinning method is decided based on only line width information without considering the state around the line, unprinted portions may be noticeable due to image loss caused by thinning if a density of an area around the line is dark.

SUMMARY OF THE INVENTION

According to one aspect of the present invention, there is provided an image processing apparatus for processing image data to be used for image formation, comprising: a black background area determination unit configured to determine a black background area formed from a plurality of black lines using the number of consecutive black lines and the number of consecutive lines adjacent to the black lines and other than the black lines out of the image data; and a thinning processing unit configured to perform thinning processing for the black background area by switching a thinning pattern to convert a value of a pixel based on the number of lines included in the black background area determined by the black background area determination unit.

According to another aspect of the present invention, there is provided an image processing apparatus for processing image data to be used for image formation, comprising: a thinning processing unit configured to, when performing thinning processing of converting a value of a pixel in a black background area formed from a plurality of black lines, switch a thinning pattern applied to the black background area to convert the value of the pixel based on the number of lines included in an area adjacent to the black background area and other than the black background area.

According to another aspect of the present invention, there is provided an image processing method of processing image data to be used for image formation, comprising: a black background area determination step of determining a black background area formed from a plurality of black lines using the number of consecutive black lines and the number of consecutive lines adjacent to the black lines and other than the black lines out of the image data; and a thinning processing step of performing thinning processing for the black background area by switching a thinning pattern to convert a value of a pixel based on the number of lines included in the black background area determined in the black background area determination step.

According to another aspect of the present invention, there is provided an image processing method of processing image data to be used for image formation, comprising: a thinning processing step of, when performing thinning processing of converting a value of a pixel in a black background area formed from a plurality of black lines, switching a thinning pattern applied to the black background area to convert the value of the pixel based on the number of lines included in an area adjacent to the black background area and other than the black background area.

According to another aspect of the present invention, there is provided a non-transitory computer-readable medium storing a program that causes a computer to function as: a black background area determination unit configured to determine a black background area formed from a plurality of black lines using the number of consecutive black lines and the number of consecutive lines adjacent to the black lines and other than the black lines out of the image data; and a thinning processing unit configured to perform thinning processing for the black background area by switching a thinning pattern to convert a value of a pixel based on the number of lines included in the black background area determined by the black background area determination unit.

According to another aspect of the present invention, there is provided a non-transitory computer-readable medium storing a program that causes a computer to function as: a thinning processing unit configured to, when performing thinning processing of converting a value of a pixel in a black background area formed from a plurality of black lines, switch a thinning pattern applied to the black background area to convert the value of the pixel based on the number of lines included in an area adjacent to the black background area and other than the black background area.

According to another aspect of the present invention, there is provided an image processing apparatus comprising: a control unit configured to, in a case where a sub-scanning direction width of an area adjacent to a line image included in image data, which has a density not more than a first predetermined density, is smaller than a first predetermined value, and the sub-scanning direction width of an area around the line image, which has a density not less than a second predetermined density, is not less than a second predetermined value, control to decrease an amount to reduce the density of the line image as compared to a case in which the sub-scanning direction width of the area adjacent to the line image, which has the density not more than the first predetermined density, is not less than the first predetermined value, and the sub-scanning direction width of the area around the line image, which has the density not less than the second predetermined density, is smaller than the second predetermined value; and a processing unit configured to perform density reduction processing of line image based on the density reduction amount controlled by the control unit.

According to another aspect of the present invention, there is provided an image processing method comprising: a control step of, in a case where a sub-scanning direction width of an area adjacent to a line image included in image data, which has a density not more than a first predetermined density, is smaller than a first predetermined value, and the sub-scanning direction width of an area around the line image, which has a density not less than a second predetermined density, is not less than a second predetermined value, controlling to decrease an amount to reduce the density of the line image as compared to a case in which the sub-scanning direction width of the area adjacent to the line image, which has the density not more than the first predetermined density, is not less than the first predetermined value, and the sub-scanning direction width of the area around the line image, which has the density not less than the second predetermined density, is smaller than the second predetermined value; and a processing step of performing density reduction processing of line image based on the density reduction amount controlled in the control step.

According to the present invention, it is possible to control the applied amount while suppressing generation of unprinted portions independently of the density around a black line in image data.

Further features of the present invention will become apparent from the following description of exemplary embodiments (with reference to the attached drawings).

BRIEF DESCRIPTION OF THE DRAWINGS

FIGS. 11A and 11B are views showing thinning setting information for the respective black line widths;

FIG. 12 is a block diagram showing details of an image conversion unit 120 according to the second embodiment;

FIGS. 17A, 17B, and 17C are views showing thinning setting information for each black line width according to the third embodiment;

DESCRIPTION OF THE EMBODIMENTS

Embodiments of the present invention will now be described with reference to the accompanying drawings. Note that application to a laser beam printer will be explained below as the embodiments of the present invention. However, the present invention is not limited to this and can be applied to an arbitrary electrophotographic image processing apparatus such as a printer or a facsimile apparatus. In the embodiments, a case will be described in which the present invention is applied to a monochrome printer. However, the present invention can also be applied to a color printer.

First Embodiment

In this embodiment, the number of black lines successive in the sub-scanning direction is counted. If the number of black lines is equal to or larger than a threshold, it is determined that there exists a black background area where the black lines are successive. Then, the downstream area from this point (the area to fix toner thereafter) is handled as the black background area. After that, the number of white lines successive in the sub-scanning direction is counted. If the number of white lines is equal to or larger than a threshold, it is determined that switching from the black background area to a white background area has occurred. Then, the downstream area from this point is handled as an area (white background area or non-black background area) other than the black background area. As a characteristic feature of this embodiment, thinning processing for black lines is controlled based on the determination result of each area.

Note that in this embodiment, line determination for black background area determination is executed for every eight pixels in the main-scanning direction in an image having a resolution of 600 dpi in the main-scanning direction. In this specification, a line is classified as one of a black line, a white line, and other lines. Note that the above-described determination unit is merely an example, and the processing may be performed in another unit. The area other than the black background area includes a line (for example, white line) other than a black line or a non-successive black line (single black line).

Figure 2:
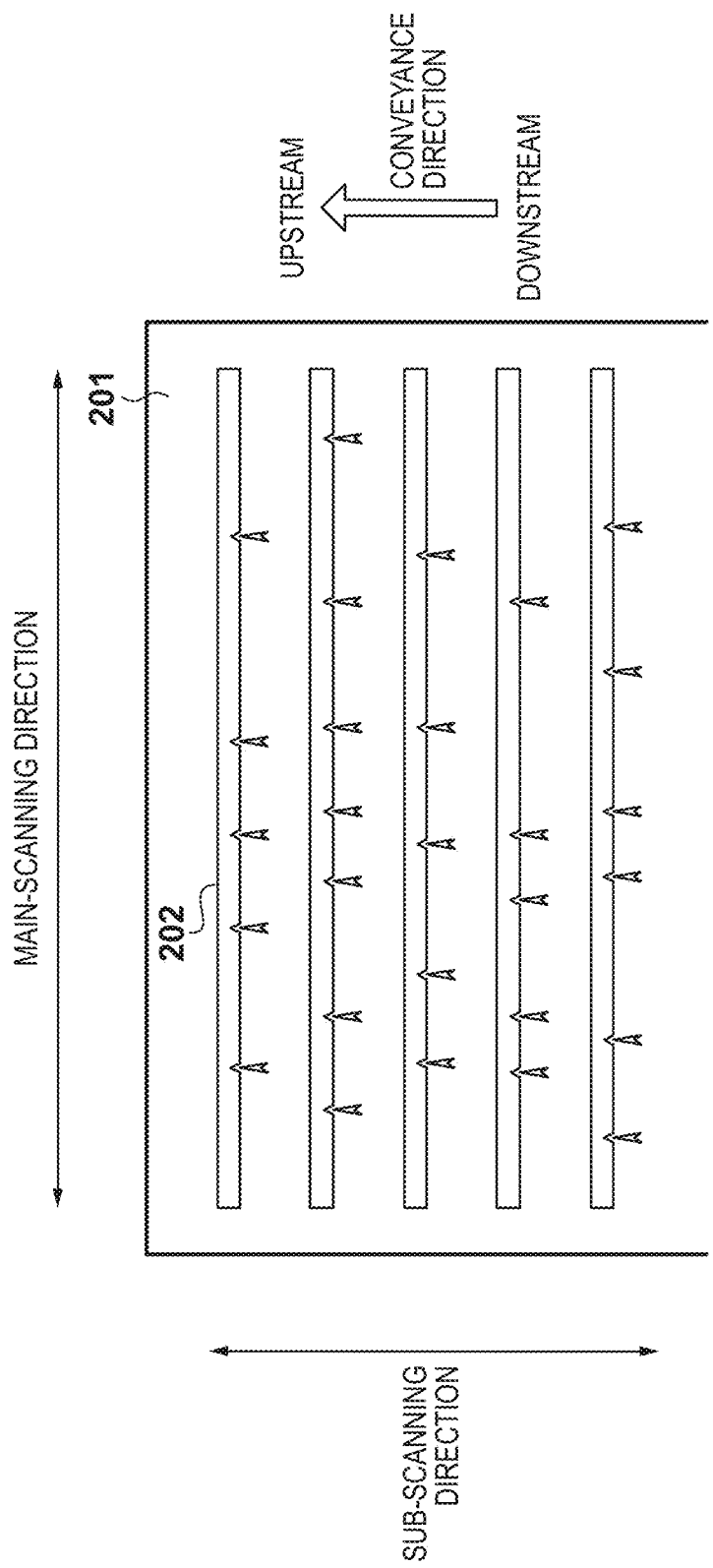
FIG. 2 is a view for explaining a tailing-blur phenomenon.
Figure 3:
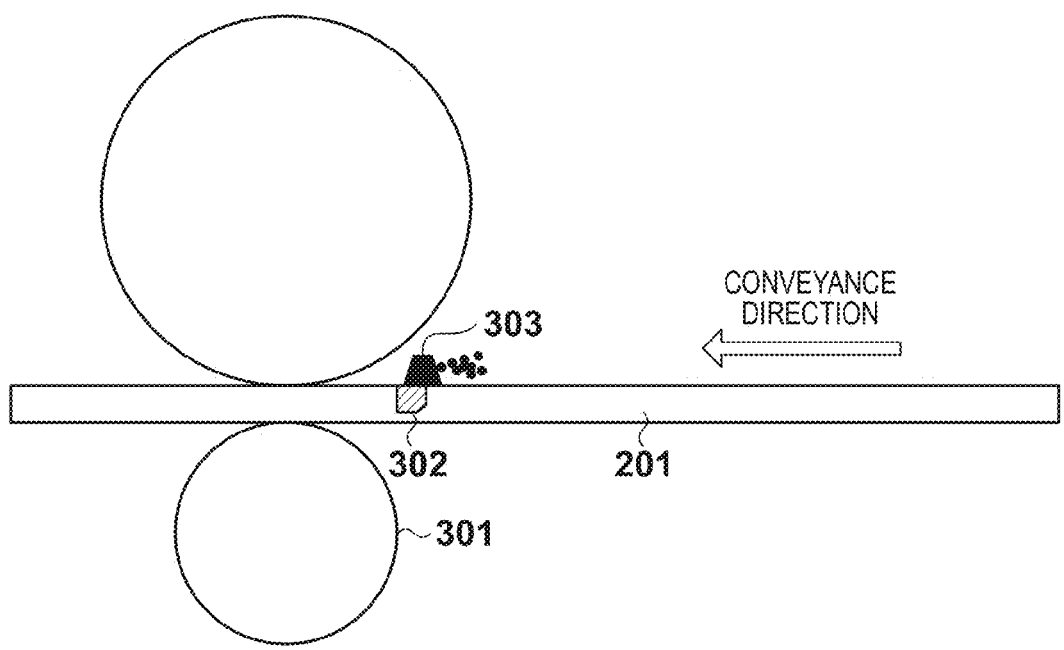
FIG. 3 is a simplified view for explaining a tailing-blur phenomenon occurrence mechanism.

In this embodiment, as shown in FIG. 2, a direction perpendicular to the conveyance direction of a printing medium such as paper in the printer will be defined as the main-scanning direction, and a direction parallel to the conveyance direction will be defined as the sub-scanning direction. In addition, a side concerning the conveyance direction where the toner is fixed first will be defined as the upstream, and a side where the toner is fixed later will be defined as the downstream.

[Overall Arrangement of System]

Figure 1:
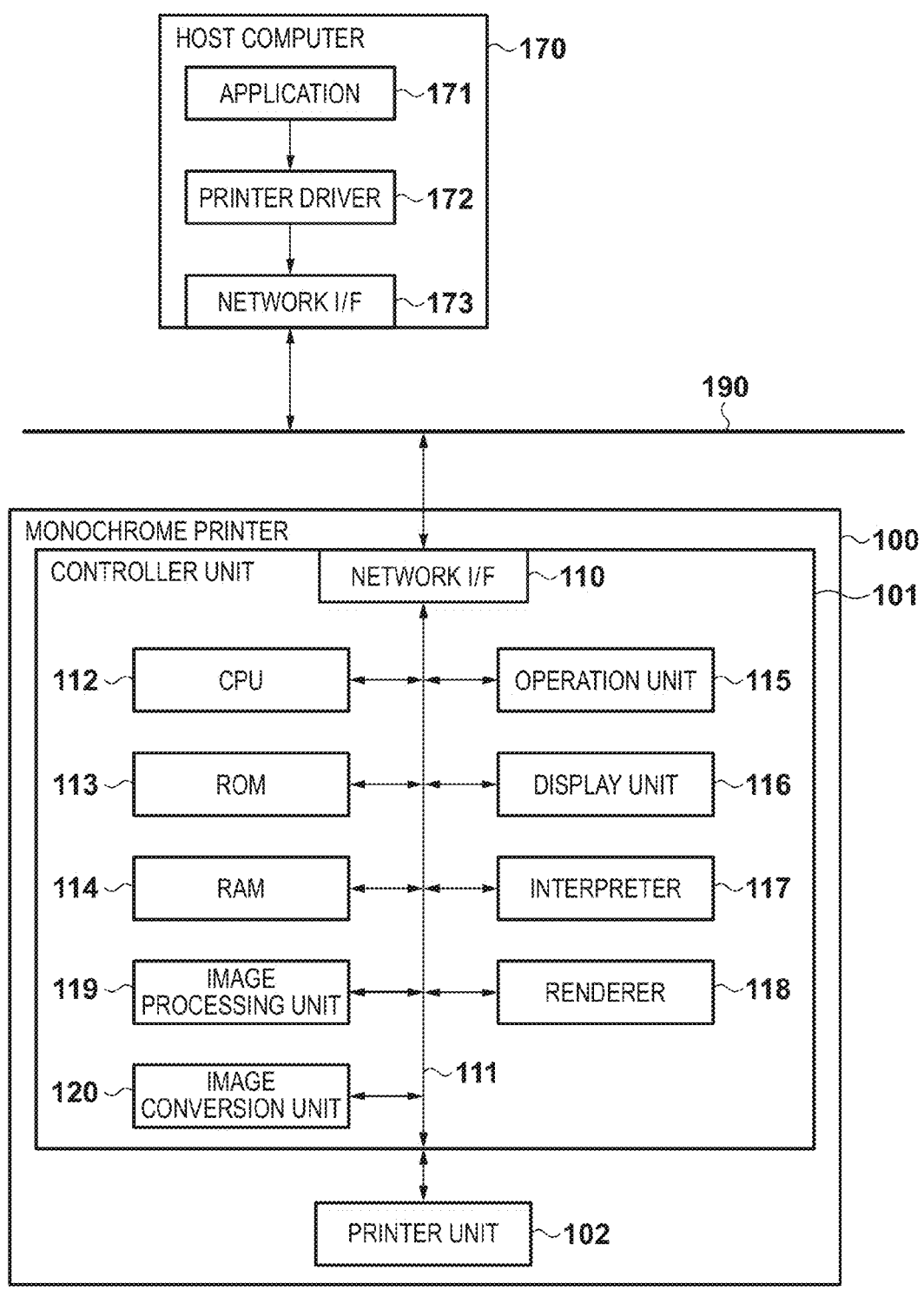
FIG. 1 is a block diagram showing the arrangement of a system according to an embodiment.

FIG. 1 is a block diagram showing the arrangement of a system according to this embodiment. A host computer 170 and a monochrome printer 100 are connected via a network 190. The host computer 170 sends a rendering command. The monochrome printer 100 converts the received rendering command into outputtable image data and performs print processing on a sheet surface.

(Host Computer)

The host computer 170 includes an application 171, a printer driver 172, and a network I/F 173.

The application 171 operates on the host computer 170. The user can create various kinds of digital document data such as a page layout document, a word processor document, and a graphic document using the application 171. The digital document data created by the application 171 is transmitted to the printer driver 172, and a rendering command based on the digital document data is generated. An example of the rendering command to be generated by the printer driver 172 is a printer description language such as PDL (Page Description Language). The generated rendering command normally includes a rendering instruction of data such as characters, graphics, and images.

The generated rendering command is transmitted to the monochrome printer 100 via the network I/F 173 and the network 190.

(Monochrome Printer)

The monochrome printer 100 includes a controller unit 101 and a printer unit 102. The controller unit 101 is formed by connecting various modules such as a CPU 112 via a data bus 111, as shown in FIG. 1. A RAM 114 loads program data stored in a ROM 113 and temporarily stores it.

The CPU 112 issues instructions to various modules in the monochrome printer 100 in accordance with the program loaded to the RAM 114 and causes the monochrome printer 100 to operate. Data generated by each module upon executing an instruction, and the like are also temporarily stored in the RAM 114. A network I/F 110 is an interface module to the network 190. The network I/F 110 performs bidirectional data communication via the network 190 based on a communication protocol such as Ethernet. For example, the network I/F 110 receives a rendering command from another device, or transmits the device information (for example, jam information and sheet size information) of the monochrome printer 100.

A display unit 116 displays a UI (User Interface) screen representing a user instruction or the state of the monochrome printer 100. An operation unit 115 is an interface to receive a user input.

An interpreter 117 interprets the rendering command received via the network I/F 110, and generates intermediate language data. A renderer 118 generates a raster image from the generated intermediate language data. An image processing unit 119 performs image processing such as color conversion processing, γ correction processing using a lookup table, and pseudo halftone processing for the generated raster image. An image conversion unit 120 performs thinning processing of suppressing the tailing-blur phenomenon for the input image data, and converts the image data into an image data format to form an image outputtable by the printer unit 102. Details of the image conversion unit 120 will be described later.

The printer unit 102 is connected to the controller unit 101, and forms image data on a sheet surface using toner based on the outputtable image data converted by the image conversion unit 120.

[Image Conversion Unit]

Figure 6:
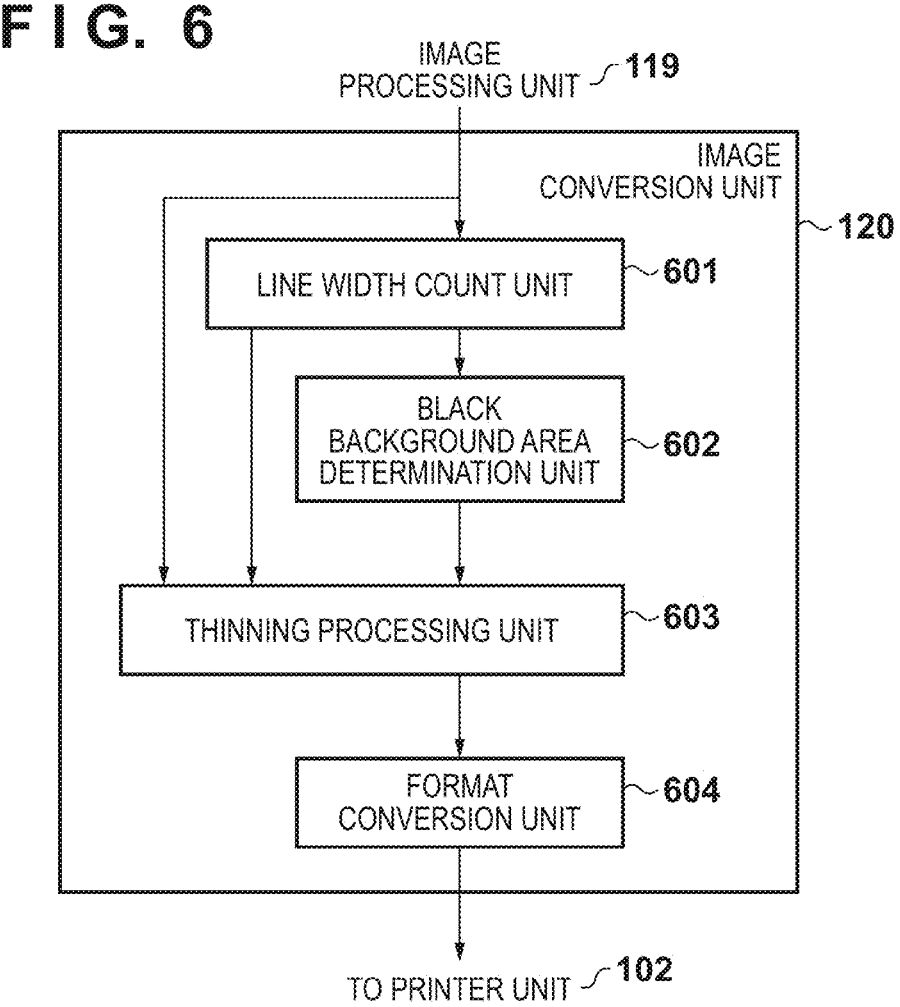
FIG. 6 is a block diagram showing details of an image conversion unit 120 according to the first embodiment.

FIG. 6 is a block diagram showing details of the image conversion unit 120 in the monochrome printer 100 according to this embodiment. The image conversion unit 120 receives an image that has undergone image processing of the image processing unit 119, converts it into an image format receivable by the printer unit 102 while performing thinning processing, and transfers the image to the printer unit 102.

The image conversion unit 120 includes a line width count unit 601, a black background area determination unit 602, a thinning processing unit 603, and a format conversion unit 604. As a characteristic feature of this embodiment, the thinning processing unit 603 is controlled based on the determination result of the black background area determination unit 602.

Note that in this embodiment, each block is supported as hardware. However, the blocks may be executed by the CPU 112 based on programs that have the respective processing functions and are stored in the ROM 113. In this case, the various kinds of programs support the function of loading/writing image data in the RAM 114 as well.

If the thinning method is decided based on only line width information without considering the state around a line, unprinted portions are noticeable due to image loss caused by thinning if a density of an area around the line is dark. The reason for this will be described. For example, assume a black background area where the perimeter of a line is covered with toner, and a black background is formed, and a white background area where a line has the background of paper around it, as indicated by 4a and 4b in FIG. 4. Although the lines at the center of 4a and 4b in FIG. 4 have the same line width, the degree of tailing-blur changes between the black background area and the white background area.

Figure 4:
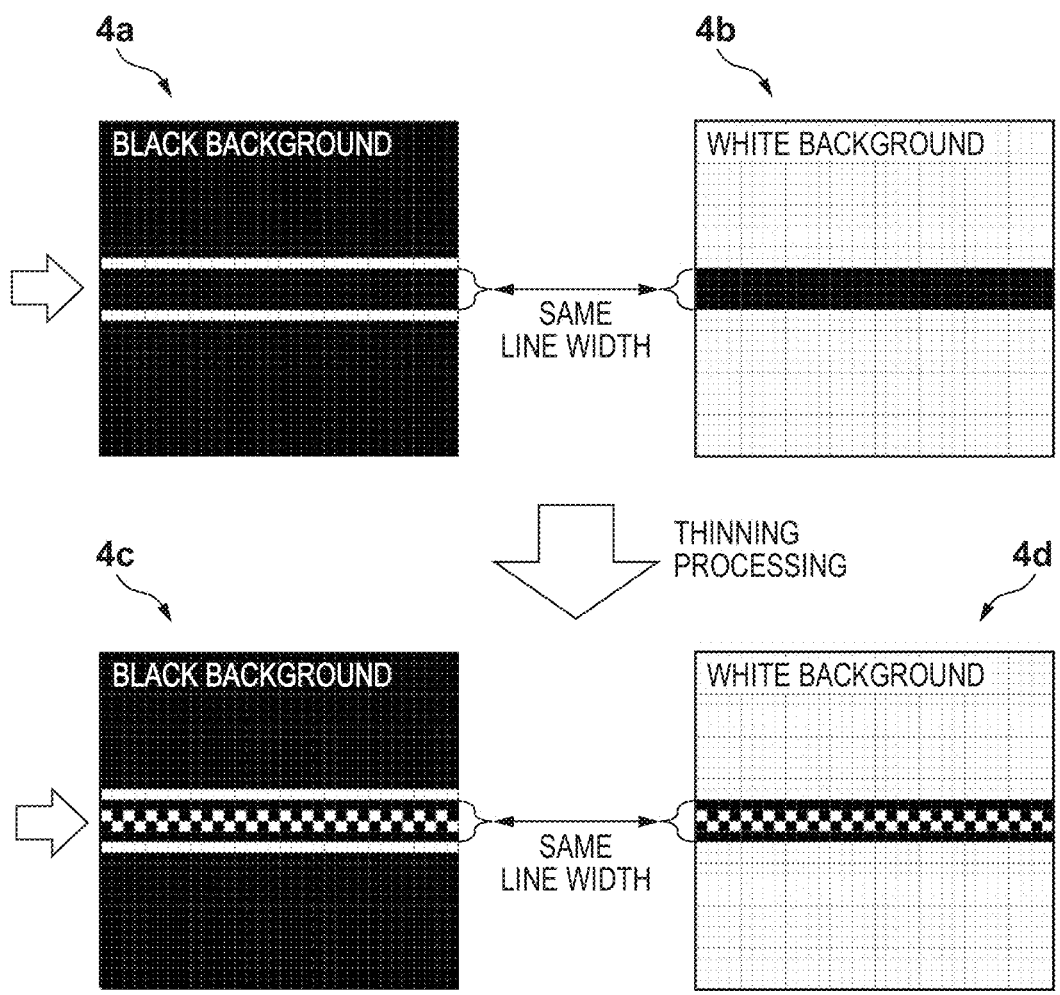
FIG. 4 is a view showing the difference in the area around a line and an example of a thinning processing result.
Figure 5:
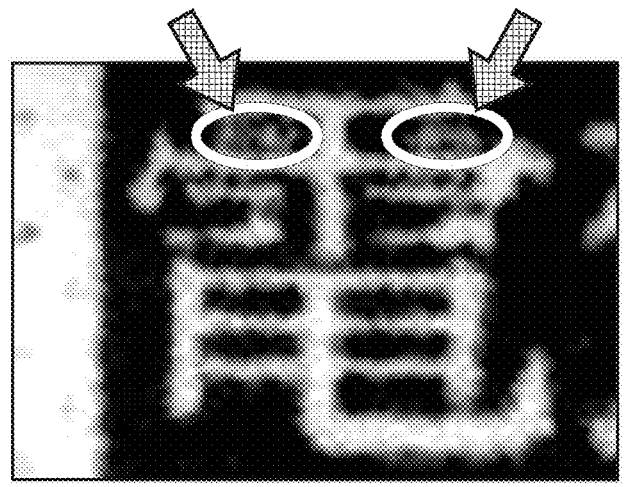
FIG. 5 is a view showing an example in which unprinted portions are generated upon thinning processing in a black background area.

When a transfer material (printing medium) 201 having a black background area passes through a fixing unit 301, water in the transfer material 201 changes to steam 302 and comes out of the reverse surface of the transfer material 201. This is because the obverse surface of the transfer material 201 is covered with the toner, and the steam cannot come out of the obverse surface. Since the steam does not come out of the obverse surface of the transfer material 201, no tailing-blur phenomenon occurs on the obverse surface having the black background area. Hence, for the black line indicated by 4a of FIG. 4, thinning processing is not performed preferably. If thinning processing indicated by 4c of FIG. 4 is performed for the black line indicated by 4a of FIG. 4, unprinted portions are generated by thinning. FIG. 5 shows an example in which unprinted portions are generated in part of an image by thinning thin lines in an outline character on a black background (corresponding to 4c of FIG. 4).

As described above, the degree of tailing-blur changes between the black line in the black background area and the black line the white background area. For this reason, thinning processing considering the state around a line is performed using the line width count unit 601, the black background area determination unit 602, and the thinning processing unit 603 shown in FIG. 6.

The line width count unit 601 divides an image received from the image processing unit 119 into strips in the vertical direction (sub-scanning direction), and determines the state of each line (black line/white line/another line) in the sub-scanning direction of a strip based on the number or ratio of black pixels in the line. As the unit of division, for example, an image having a resolution of 600 dpi in the main-scanning direction is divided for every eight pixels in the main-scanning direction. The line width count unit 601 counts the line width (the number of successive lines of same type) in the sub-scanning direction in each strip based on the line determination result. Note that the state of each line in the sub-scanning direction of the image may be determined without dividing the image into strips. Detailed processing of the line width count unit 601 will be described later with reference to the flowchart of FIG. 7.

The black background area determination unit 602 determines, based on the line width information counted by the line width count unit 601, whether a line of interest is located in a black background area formed from a plurality of black lines. In addition, the black background area determination unit 602 changes a background area flag in accordance with the determination result. Detailed processing of the black background area determination unit 602 will be described later with reference to the flowchart of FIG. 8.

The thinning processing unit (density reduction processing unit) 603 performs thinning processing (density reduction processing) for the image received from the image processing unit 119 based on the line width information and the black background area flag obtained from the line width count unit 601 and the black background area determination unit 602. Detailed processing of the thinning processing unit 603 will be described later with reference to the flowchart of FIG. 9.

The format conversion unit 604 converts the image that has undergone the thinning processing of the thinning processing unit 603 into an image format receivable by the printer unit 102, and transfers the image to the printer unit 102.

(Line Width Count Unit)

Figure 7:
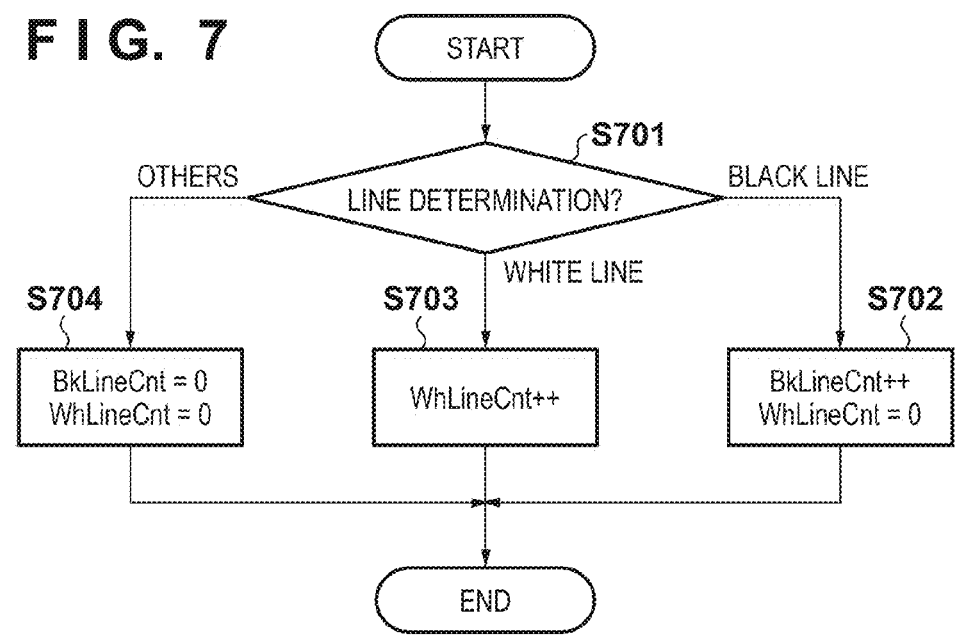
FIG. 7 is a flowchart showing the operation of a line width count unit 601.

FIG. 7 is a flowchart showing an example of processing of the line width count unit 601. This processing can be implemented by, for example, causing the CPU 112 to execute processing based on a program stored in the ROM 113. A counter for the number of white lines (white background area width) is represented by a variable WhLineCnt, and a counter for the number of black lines (black background area width) is represented by a variable BkLineCnt.

In step S701, the line width count unit 601 sets one line in a divided strip as the line of interest and performs line determination. In the line determination, each line is classified as one of a black line, a white line, and other lines. For example, assume that the processing is performed for every eight pixels of an image having a resolution of 600 dpi in the main-scanning direction. At this time, if, for example, eight pixels in the line of interest are black pixels, the line width count unit 601 determines the line as a black line. If the number of black pixels is 0, the line width count unit 601 determines the line as a white line. If the number of black pixels is neither 0 nor 8, the line width count unit 601 determines the line of interest as another line. Note that the number of black pixels used for the determination of the black line and the white line can arbitrarily be set by threshold setting (not shown), and is not limited to the above-described number of pixels. For example, if at least six of eight pixels of the line of interest are black pixels, the line may be determined as a black line. If the number of black pixels among the eight pixels is 1 or less, the line may be determined as a white line.

If the line of interest is a black line, the process advances to step S702, and the line width count unit 601 increments the counter of the number of black lines by one (BkLineCnt++). In addition, the line width count unit 601 clears the counter of the number of white lines (WhLineCnt=0). If the line of interest is a white line, the process advances to step S703, and the line width count unit 601 increments the counter of the number of white lines by one (WhLineCnt++). Otherwise, the process advances to step S704, and the line width count unit 601 clears the counters (BkLineCnt=0, WhLineCnt=0).

Only two counters are provided here for the descriptive convenience. However, a counter for "other lines" may be provided and used at the time of thinning processing. Although not illustrated, if the line of interest is the first line of the image, each counter is initialized at the start of processing.

When the processing shown in FIG. 7 has ended for the line of interest, the process advances to processing of the black background area determination unit 602.

(Black Background Area Determination Unit)

Figure 8:
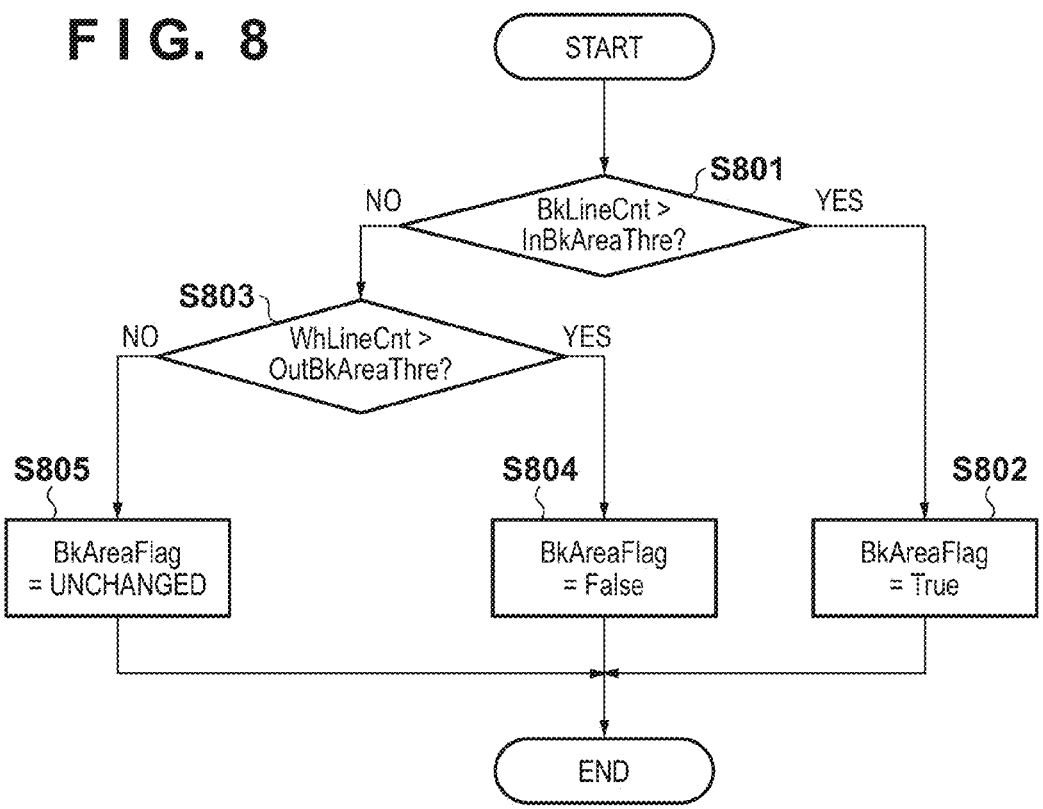
FIG. 8 is a flowchart showing the operation of a black background area determination unit 602.

FIG. 8 is a flowchart showing an example of processing of the black background area determination unit 602. This processing can be implemented by, for example, causing the CPU 112 to execute processing based on a program stored in the ROM 113. A threshold (first threshold) used upon determining that switching to the black background area has occurred is represented by InBkAreaThre. A threshold (second threshold) used upon determining that switching from the black background area to the white background area has occurred is represented by OutBkAreaThre. The thresholds are defined in advance and used as thresholds for the number of successive lines. For example, InBkAreaThre is defined as 2, and OutBkAreaThre is defined as 0. The black background area flag is represented by a variable BkAreaFlag.

In step S801, the black background area determination unit 602 determines based on the number of black lines whether switching to the black background area has occurred. If the number of black lines (BkLineCnt) is larger than the threshold (InBkAreaThre) (YES in step S801), the black background area determination unit 602 determines that switching to the black background area has occurred, and sets the black background area flag (BkAreaFlag=True). If the number of black lines (BkLineCnt) is equal to or smaller than the threshold (NO in step S801), the process advances to step S803. In step S803, the black background area determination unit 602 determines based on the number of successive white lines whether switching from the black background area to the white background area has occurred. If the number of black lines (WhLineCnt) is larger than the threshold (OutBkAreaThre) (YES in step S803), the black background area determination unit 602 clears the black background area flag in step S804 (BkAreaFlag=False). If the number of white lines is equal to or smaller than the threshold (NO in step S803), the black background area determination unit 602 does not change the black background area flag (step S805).

Note that although not illustrated, if the line of interest is the first line of the image, the black background area flag is initialized at the start of processing. When the updating of the black background area flag has ended, the process advances to processing of the thinning processing unit 603.

(Thinning Processing Unit)

Figure 9:
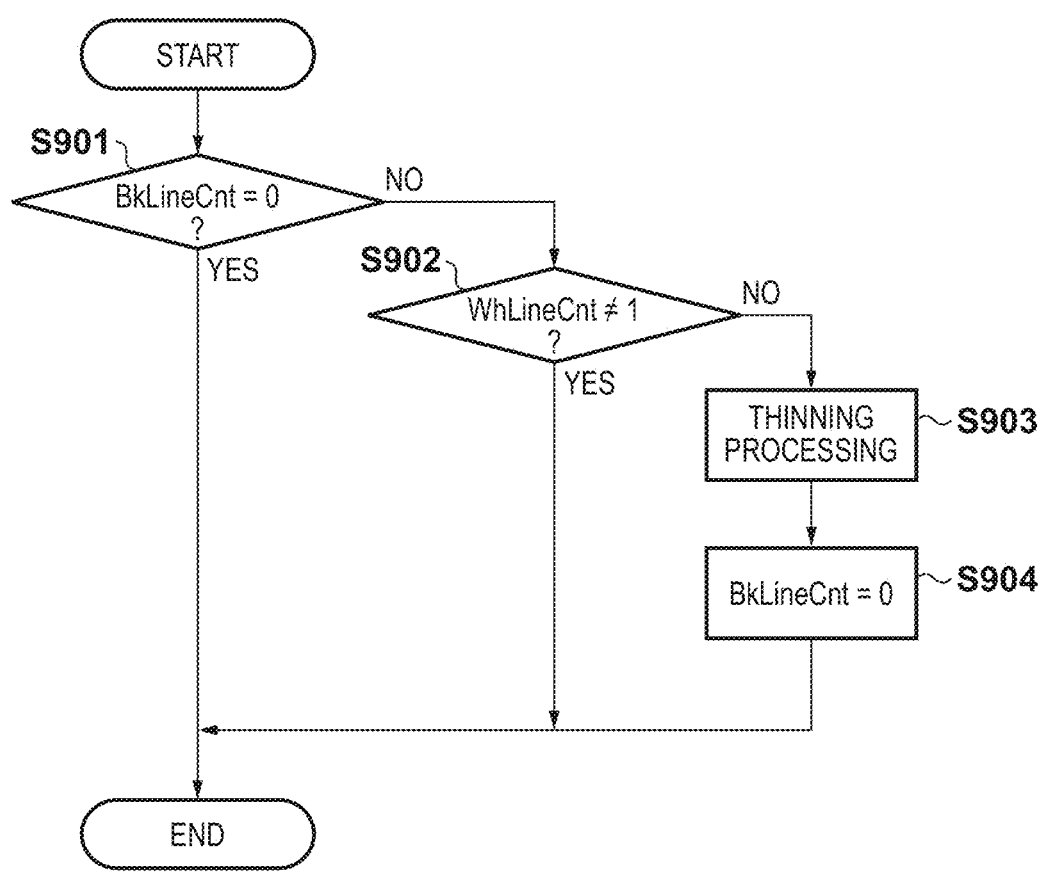
FIG. 9 is a flowchart showing the operation of a thinning processing unit 603.

FIG. 9 is a flowchart showing an example of processing of the thinning processing unit 603. This processing can be implemented by, for example, causing the CPU 112 to execute processing based on a program stored in the ROM 113.

In step S901, the thinning processing unit 603 determines based on the number of black lines whether there is a black line to be thinned. If the number of black lines (BkLineCnt) is 0 (YES in step S901), the processing procedure ends. After that, the line of interest is shifted to the next line, and the processes of the line width count unit 601 to the thinning processing unit 603 (FIGS. 7 to 9) are repeated up to the final line.

If the number of black lines is larger than 0 (NO in step S901), the process advances to step S902. In step S902, the thinning processing unit 603 determines based on the number of white lines whether there is a possibility that the next line is a successive black line. If the number of white lines (WhLineCnt) is not 1 (YES in step S902), there is a possibility that the next line is a successive black line, and the black line width is still undetermined. Hence, the thinning processing unit 603 ends the processing procedure without executing thinning processing. After that, the line to be processed is shifted to the next line, and the processing is repeated from the line width count unit 601 up to the final line. If the number of white lines is 1 (NO in step S902), there is no possibility that the next line is a successive black line, and the black line width is determined. In step S903, the thinning processing unit 603 executes thinning processing for the black line in the determined width. Details of the thinning processing to be executed here will be described later.

After the thinning processing, the thinning processing unit 603 clears the black line counter (BkLineCnt=0) in step S904. The processing procedure then ends. After that, the line to be processed is shifted to the next line, and the processes of the line width count unit 601 to the thinning processing unit 603 (FIGS. 7 to 9) are repeated up to the final line.

In the thinning processing (step S903) according to this embodiment, after the black line width and the black background area flag are determined, the thinning position and the thinning amount in the black line are decided based on the black line width. That is, the thinning processing is applied to a line on the near side of the line of interest currently under the processing. Hence, using a line buffer, the thinning processing unit 603 outputs, to the format conversion unit 604, the image data of the lines whose output contents are completely determined, including the presence/absence of thinning processing.

(Thinning Processing)

Details of thinning processing in step S903 of FIG. 9 will be described next with reference to FIGS. 10, 11A, and 11B. The outline of thinning processing will be described first with reference to FIG. 10.

Figure 10:
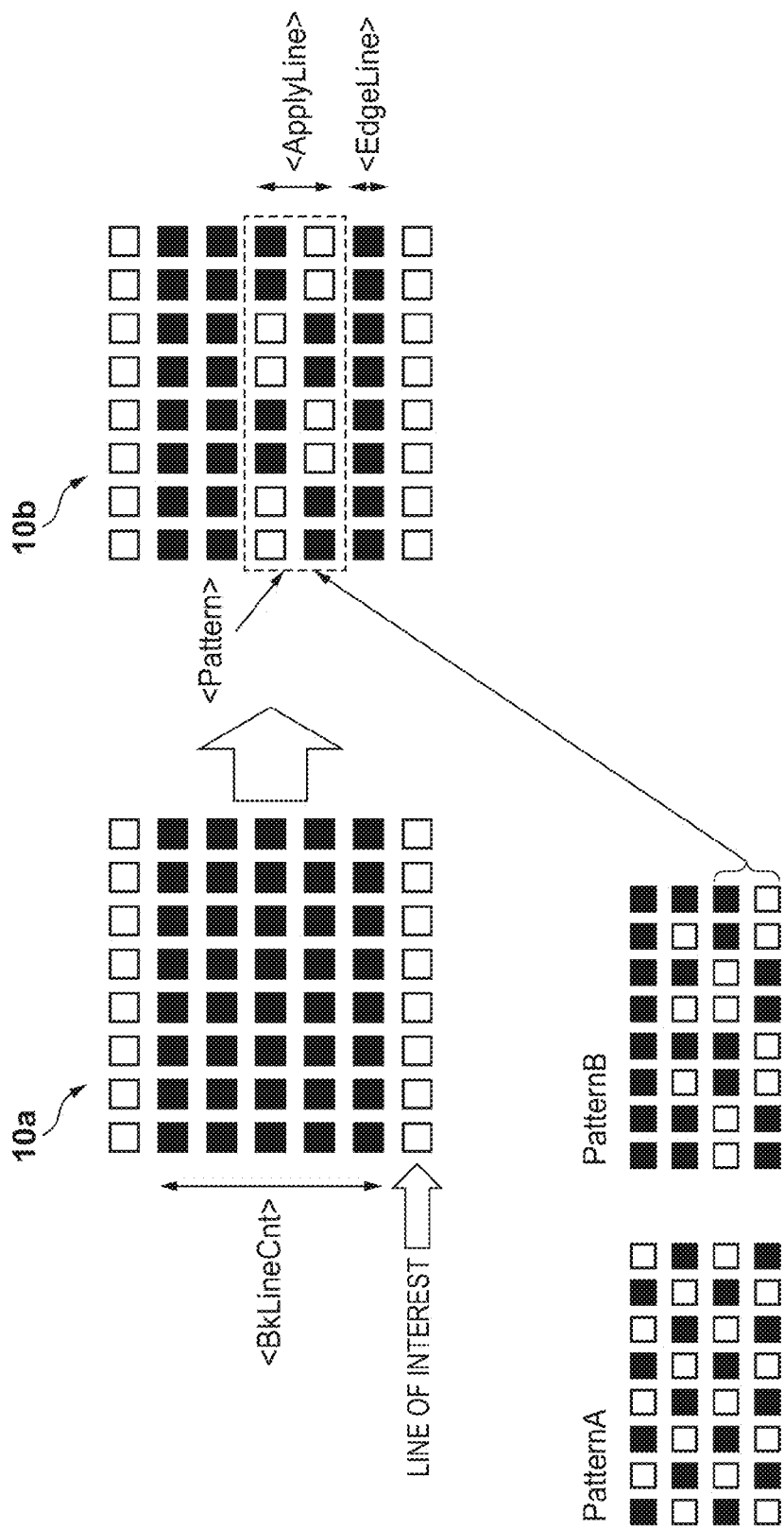
FIG. 10 is a view showing an example of a result of thinning processing based on thinning processing settings.

FIG. 10 shows a detailed example of application of thinning processing based on black line width information (BkLineCnt) and thinning setting information held in advance. Note that the thinning setting information is defined in advance and stored in the ROM 113 or the like serving as a storage unit.

In FIG. 10, 10a indicates a state before the thinning processing is applied to image data, and 10b indicates a state after the thinning processing is applied. The thinning setting information used in FIG. 10 is defined to apply a thinning pattern to two lines (ApplyLine=2) while leaving the edge of one line (EdgeLine=1) when the black line width is 5 (BkLineCnt=5). The thinning pattern to be applied is pattern B. Since ApplyLine=2, two downstream lines of pattern B are used for the thinning processing. The thinning pattern represents a pattern that replaces pixels (black pixels) to apply toner with white pixels. That is, in this specification, thinning indicates replacing black pixels (pixels to output toner) with white pixels (pixels not to output toner). Note that in this specification, processing is performed for black lines. If another color is to be processed in a color printer, pixels to output each color toner may be replaced with white pixels.

Note that the Pattern size is not limited to the 4×8 pixel size shown in FIG. 10, and may be changed in accordance with the resolution or the like of the input/output image. The white/black pattern registered in the Pattern need not always be periodical. The pattern may suppress the thinning amount or rate as the distance from the edge increases.

FIGS. 11A and 11B show thinning setting information for the respective black background area states. FIG. 11A shows thinning setting information to be applied to a black background area where the black background area flag (BkAreaFlag) is set. FIG. 11B shows thinning setting information to be applied to a non-black background area where the black background area flag (BkAreaFlag) is not set. The thinning processing is executed while switching various parameters (Pattern, EdgeLine, ApplyLine) based on the thinning setting information, black background area flag (BkAreaFlag), and black line width information (BkLineCnt). Control can thus be performed to execute processing while switching the thinning pattern between the black background area and the non-black background area and suppress the thinning amount in the black background area as compared to the non-black background area.

As described above, in this embodiment, a black background area is determined, and thinning processing is controlled in accordance with the state of the area. This makes it possible to suppress generation of unprinted portions due to image loss in the black background area and suppress the tailing-blur phenomenon in other areas.

That is, in the related art, when thinning processing is set to change 4b of FIG. 4 to 4d of FIG. 4 to suppress the tailing-blur phenomenon in the white background area, 4a of FIG. 4 in the black background area always results in 4c of FIG. 4, and unprinted portions are generated in the black background area. On the other hand, according to this embodiment, the thinning amount of 4a of FIG. 4 is suppressed in the black background area while performing sufficient thinning in the white background area that readily causes tailing-blur so that 4b of FIG. 4 is changed to 4d of FIG. 4. It is therefore possible to prevent generation of unprinted portions in the black background area.

Second Embodiment

In this embodiment, a case in which a thinning processing method different from the first embodiment is used will be described. In the following embodiment, only different points will be explained.

In the first embodiment, the width of an area is specified from a counter value obtained by the line width count unit 601, and the thinning processing unit 603 executes thinning processing based on it. In the second embodiment, as shown in FIG. 12, a thinning processing unit 1201 does not receive information from a line width count unit 601. That is, instead of specifying the thinning portion from the counter value, the thinning processing unit 1201 performs pattern matching processing by comparing an image pattern capable of extracting a straight line in the main-scanning direction having a specific width in the sub-scanning direction with image data to be processed.

Figure 13:
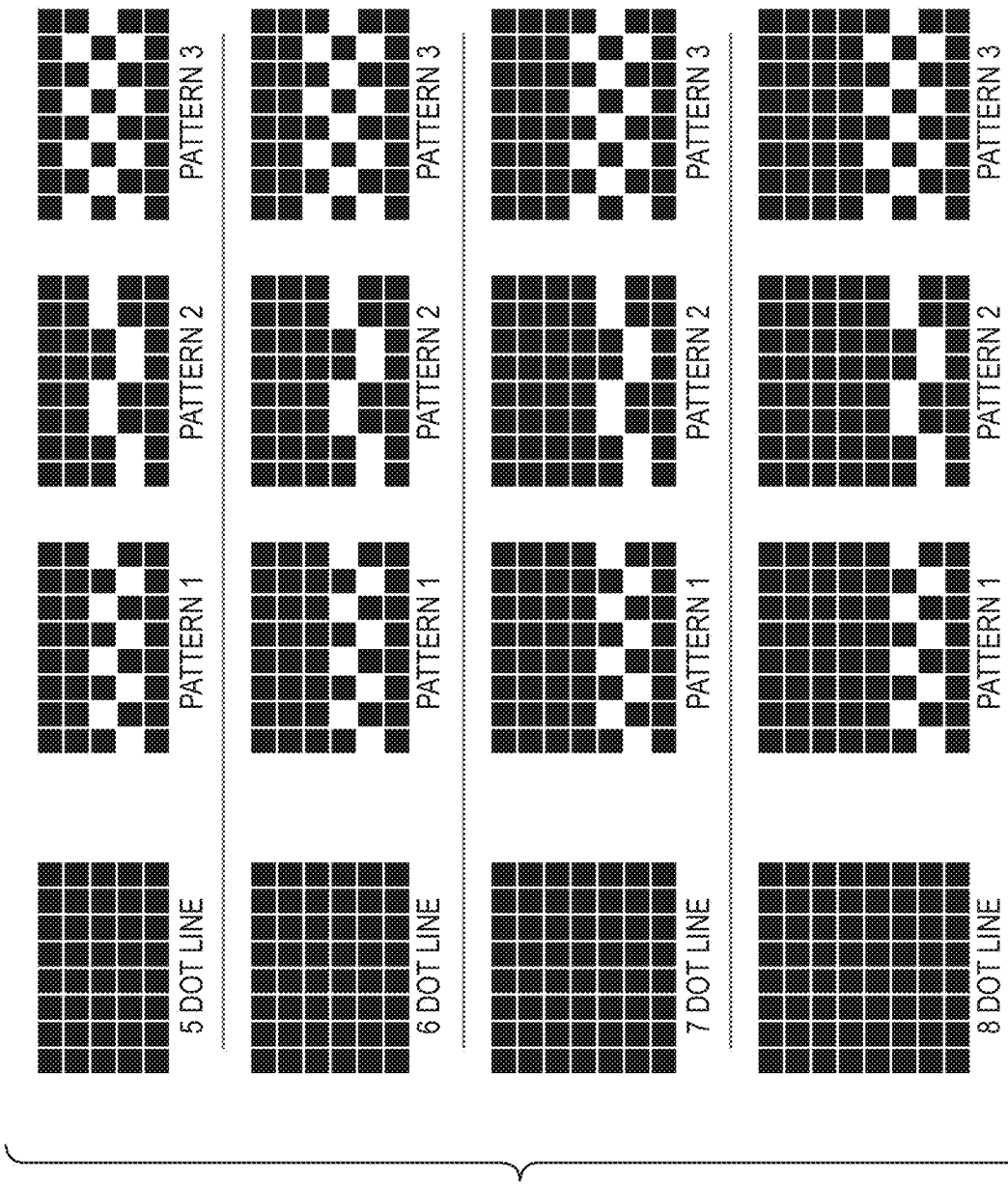
FIG. 13 is a view showing an example of a non-black background area thinning pattern according to the second embodiment.
Figure 14:
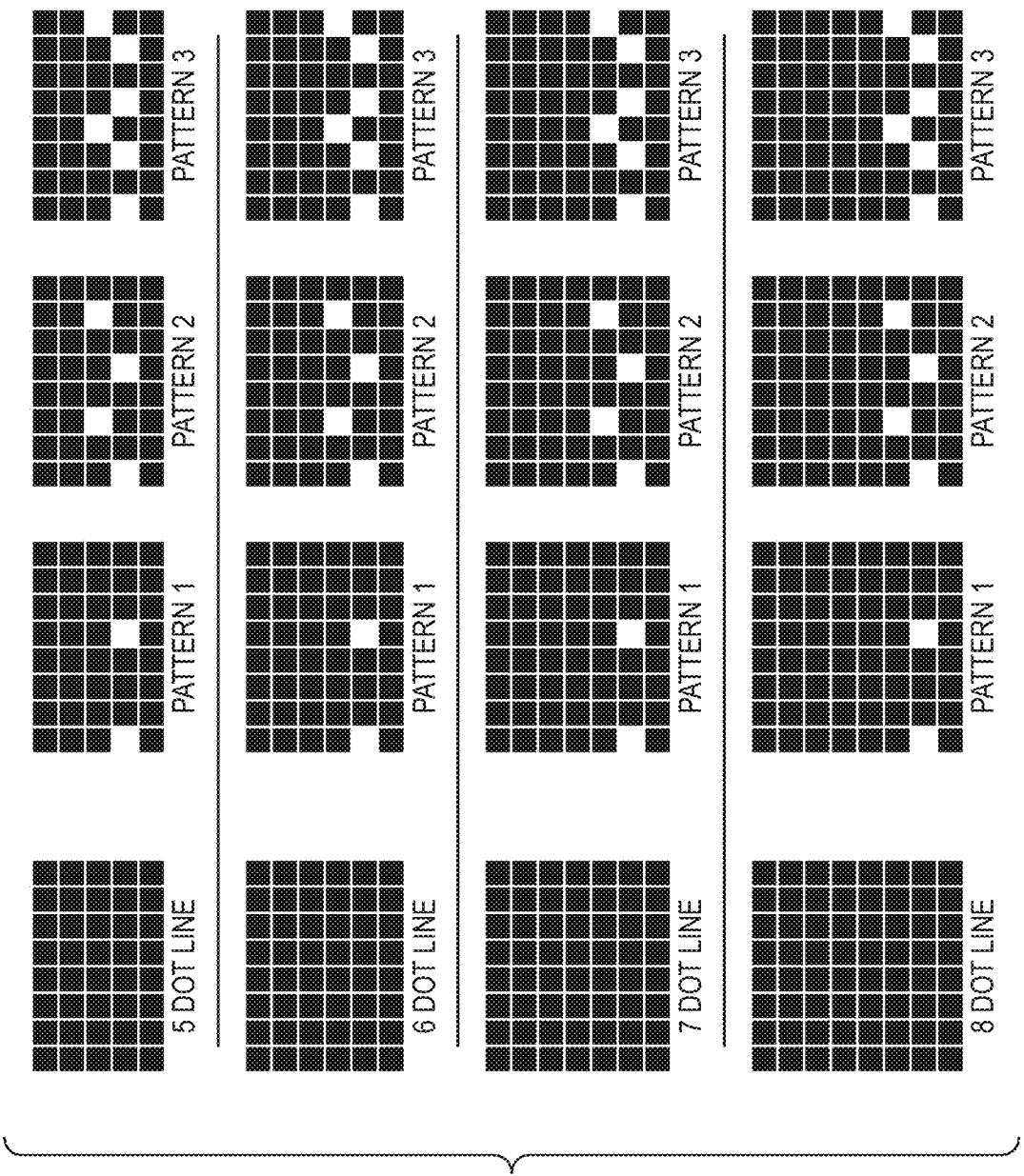
FIG. 14 is a view showing an example of a black background area thinning pattern according to the second embodiment.

Replacement with a thinning pattern preset in correspondence with an image pattern as shown in FIG. 13 or 14 is executed for the thinning portion specified by the pattern matching processing. The thinning pattern information is stored in a ROM 113 or the like serving as a storage unit. At this time, the black background area flag (BkAreaFlag) obtained from a black background area determination unit 602 is referred to. For a non-black background area, a thinning pattern shown in FIG. 13 is used. For a black background area, a thinning pattern shown in FIG. 14 is used. The thinning patterns for the black background area shown in FIG. 14 suppress the thinning amount as compared to the thinning patterns for the non-black background area shown in FIG. 13. This makes it possible to suppress the thinning amount in the black background area as compared to the non-black background area and suppress generation of unprinted portions in the black background area.

Note that there are many known techniques of pattern matching processing, and any method is usable in this embodiment. In addition, any method is usable to select a pattern to be used for each line width. The pattern may be designated via an operation unit 115 and a display unit 116, or an optimum pattern may be designated from, for example, a sensor that grasps the state of the image processing apparatus.

As described above, in the arrangement according to the second embodiment as well, a black background area is determined, and thinning processing is controlled in accordance with the state of the black background area, as in the first embodiment. This makes it possible to suppress generation of unprinted portions due to image loss in the black background area.

Third Embodiment

As a characteristic feature of this embodiment, thinning processing is performed while placing focus on only the generation source of steam that causes the tailing-blur phenomenon. That is, thinning processing is controlled while placing focus on the background (white background) amount immediately before a black line, unlike the first and second embodiments in which whether an area is a black background area is determined based on the number of black lines.

Figure 15:
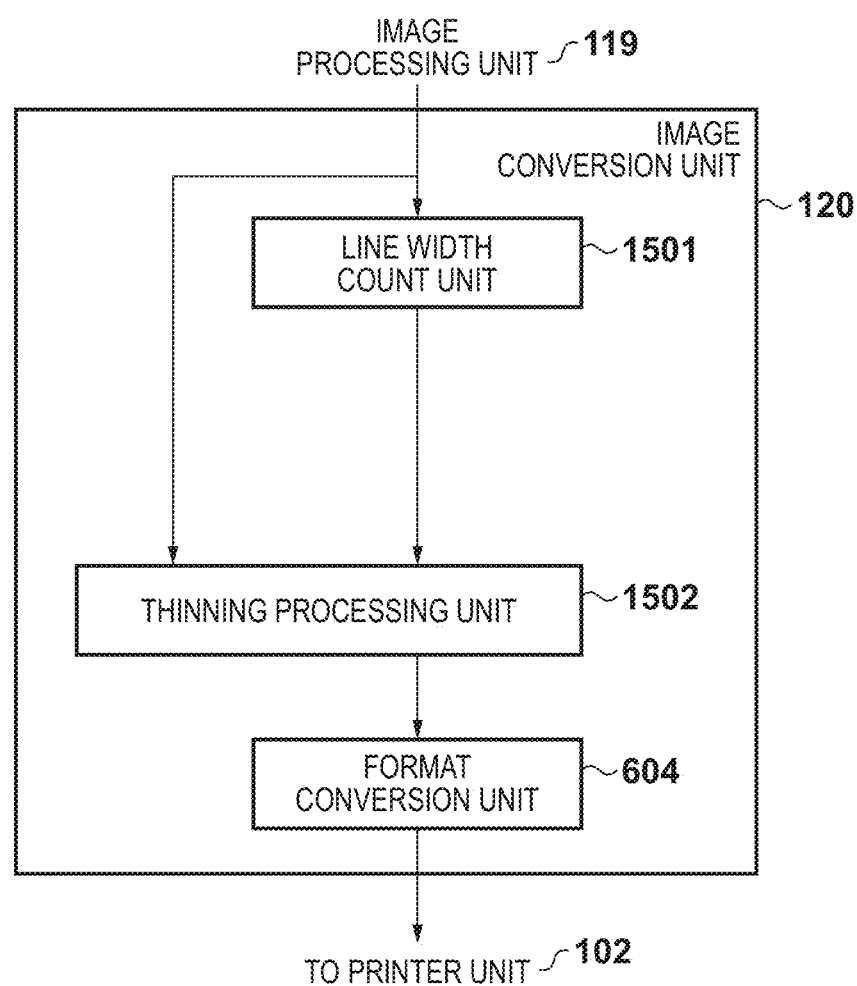
FIG. 15 is a block diagram showing details of an image conversion unit 120 according to the third embodiment.

This will be described with reference to FIGS. 15 and 16. FIG. 15 is a block diagram showing details of an image conversion unit 120. The image conversion unit 120 receives an image that has undergone image processing of an image processing unit 119, converts it into an image format receivable by a printer unit 102 while performing thinning processing, and transfers the image to the printer unit 102.

The image conversion unit 120 includes a line width count unit 1501, a thinning processing unit 1502, and a format conversion unit 604. As a characteristic feature of this embodiment, the line width count unit 1501 acquires the background (white background) amount immediately before a black line from received line width information, and the thinning processing unit 1502 controls thinning processing in accordance with the background amount.

Figure 16:
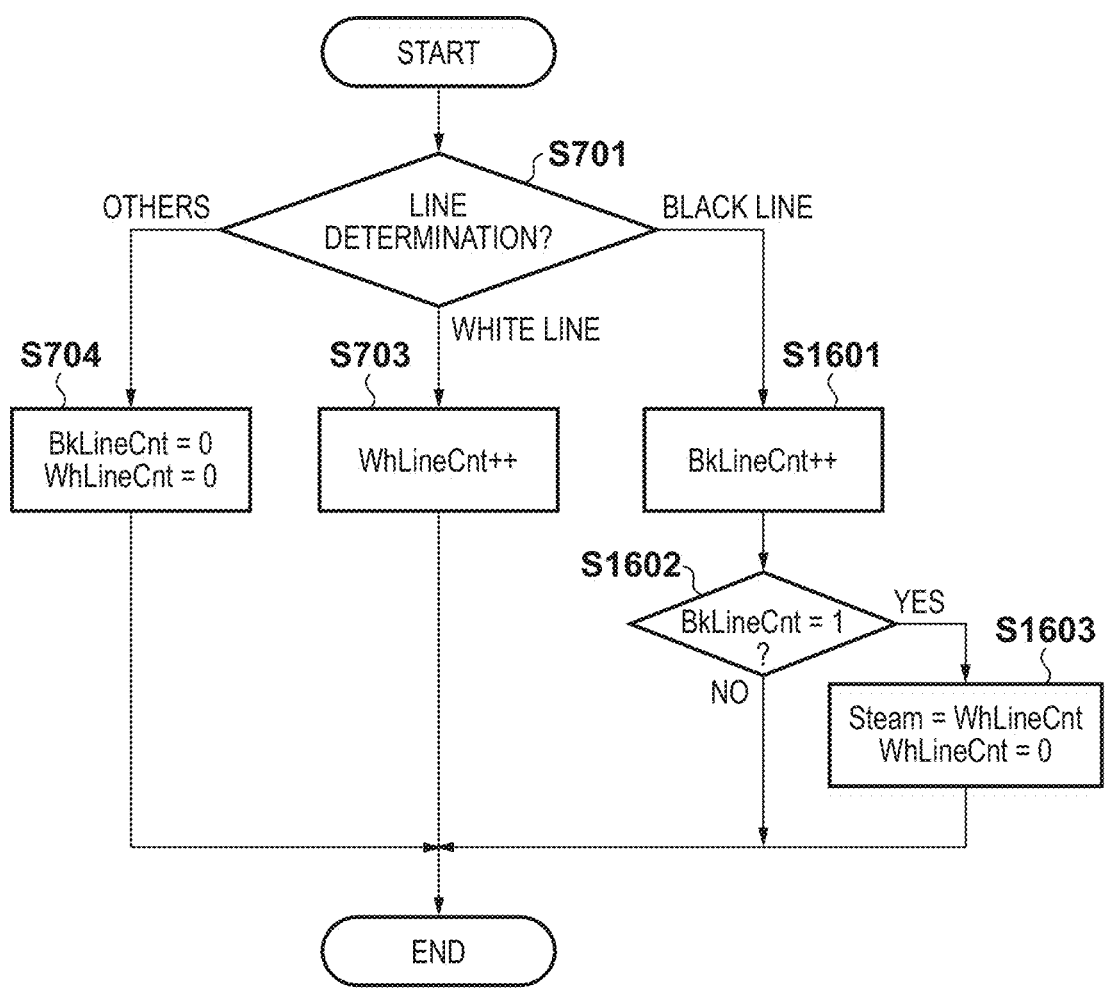
FIG. 16 is a flowchart showing the operation of a line width count unit 1501 according to the third embodiment.

FIG. 16 is a flowchart showing an example of processing of the line width count unit 1501. This processing can be implemented by, for example, causing a CPU 112 to execute processing based on a program stored in a ROM 113.

In step S701, the line width count unit 1501 sets one line in a divided strip as the line of interest and performs line determination. In the line determination, each line is classified as one of a black line, a white line, and other lines. For example, assume that the processing is performed for every eight pixels of an image having a resolution of 600 dpi in the main-scanning direction. At this time, if, for example, eight pixels in the line of interest are black pixels, the line width count unit 1501 determines the line as a black line. If the number of black pixels is 0, the line width count unit 1501 determines the line as a white line. If the number of black pixels is neither 0 nor 8, the line width count unit 1501 determines the line of interest as another line.

If the line of interest is a black line, the process advances to step S1601, and the line width count unit 1501 increments the counter of the number of black lines by one (BkLineCnt++). After that, in step S1602, the line width count unit 1501 senses and determines the start of the black line. If BkLineCnt=1 which represents the start of the black line (YES in step S1602), the process advances to step S1603. On the other hand, if BkLineCnt≠1 which represents a consecutive black line (NO in step S1602), the processing procedure ends.

In step S1603, the line width count unit 1501 saves the immediately preceding number of white lines (WhLineCnt) as a steam generation amount (Steam) (Steam=WhLineCnt), and clears the counter of the number of white lines (WhLineCnt=0). This is because it is the start timing of a black line. The processing procedure ends, and the process advances to processing of the thinning processing unit 1502. The larger the immediately preceding number of white lines is, the larger the amount of steam generated from the surface of the printing medium is.

If the line of interest is a white line, the process advances to step S703, and the line width count unit 1501 increments the counter of the number of white lines by one (WhLineCnt++). Otherwise, the process advances to step S704, and the line width count unit 1501 clears the counters (BkLineCnt=0, WhLineCnt=0). The processing procedure ends, and the process advances to processing of the thinning processing unit 1502.

The thinning processing unit 1502 performs the same processing procedure (FIG. 9) as that of the thinning processing unit 603 according to the first embodiment. More specifically, in the thinning processing of the thinning processing unit 1502, the thinning amount is switched based on the immediately preceding steam amount (Steam) in accordance with the settings shown FIGS. 17A to 17C. Note that in FIGS. 17A to 17C, the thinning amount is selectively applied based on the steam amounts of three levels. However, the present invention is not limited to this, and finer level setting may be done.

As described above, according to the third embodiment, regarding the background amount (number of white lines) immediately before a black line as a steam generation amount (Steam), thinning processing is controlled in accordance with the steam generation amount. This makes it possible to suppress generation of unprinted portions due to image loss while executing thinning processing in an area without the background where the tailing-blur phenomenon may occur.

Fourth Embodiment

In the first to third embodiments, only processes of the image conversion unit 120 which are associated with thinning processing that basically yields the tailing-blur phenomenon suppression effect have been explained.

Figure 18:
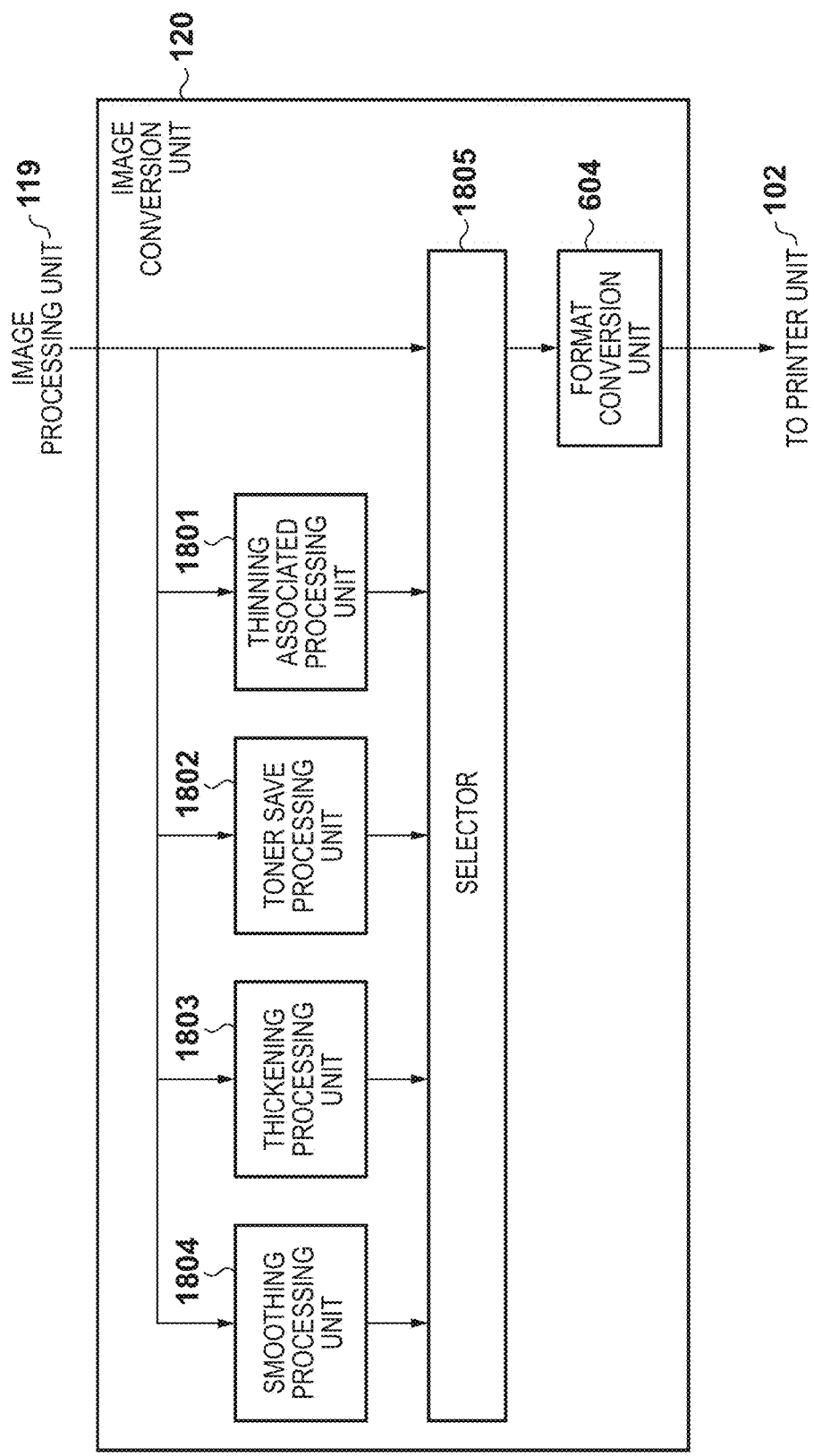
FIG. 18 is a block diagram showing details of an image conversion unit 120 according to the fourth embodiment.
Figure 19:
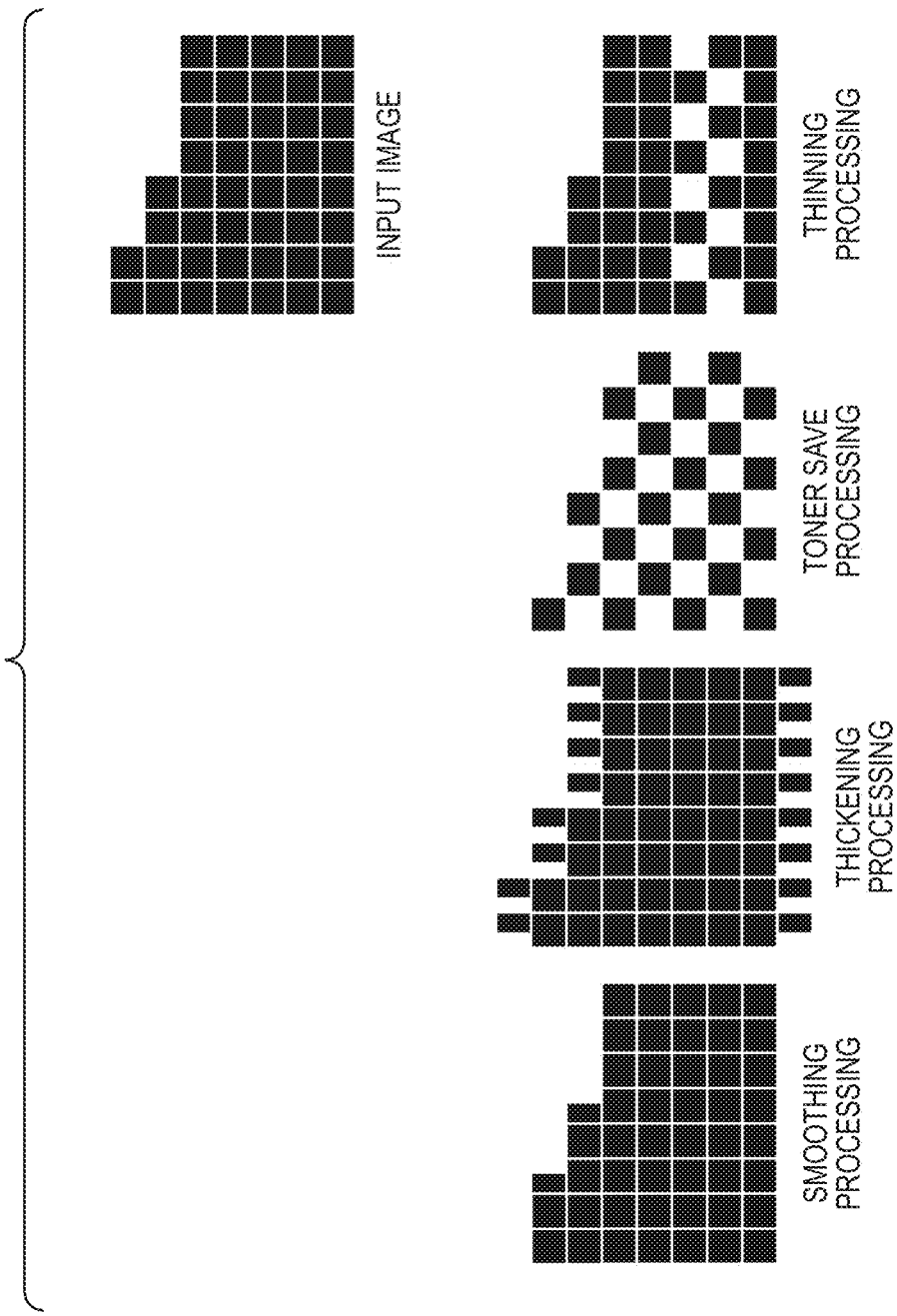
FIG. 19 is a view showing examples of the results of different image processes according to the fourth embodiment.

In this embodiment, as shown in FIG. 18, an image conversion unit 120 parallelly executes image processing (second image processing) other than the thinning processing. FIG. 19 shows examples of results obtained by applying the respective image processes to the same input image. For a pixel that has changed from that in the original image due to image processing of one of the processing units, a selector 1805 selects the value of the pixel as the output pixel. If no change has occurred, the value of the pixel in the original image is employed. Priority setting or exception designation may be done of the result of each processing unit by settings.

As shown in FIG. 18, the image conversion unit 120 according to this embodiment includes a thinning associated processing unit 1801, a toner save processing unit 1802, a thickening processing unit 1803, a smoothing processing unit 1804, the selector 1805, and a format conversion unit 604.

Each process in the image conversion unit 120 can be implemented by, for example, causing a CPU 112 to execute the process based on a program stored in a ROM 113.

The thinning associated processing unit 1801 integrally represents the line width count unit, the black background area determination unit, the thinning processing unit, and the like described in one of the above-described embodiments. The toner save processing unit 1802 performs processing of thinning not only line portions but dots overall, unlike thinning processing. The thickening processing unit 1803 performs processing of detecting a line edge and adding dots outside the edge. The smoothing processing unit 1804 performs processing of detecting a line edge and adding small dots to reduce jaggy. The selector 1805 has a function of selecting pixel values to be employed out of an image result received from one of the processing units.

In this embodiment, the thinning associated processing unit 1801 is operated as in the above-described embodiments under the parallel arrangement. When dots are thinned overall by toner save, the tailing-blur phenomenon does not occur in the first place, and the thinning processing need not be executed. Control may be done to prohibit the thinning associated processing unit 1801 from executing thinning processing when toner save is executed. Alternatively, control may be done to cause the selector 1805 to exclude the result of the thinning associated processing unit 1801.

The thickening processing or smoothing processing is processing of adding dots outside a line portion, as shown in FIG. 19, and the processing result never conflicts with thinning processing that influences the inside of a line. For this reason, control of the thinning associated processing unit 1801 need not be changed.

As described above, processing that gives each image effect shown in FIG. 18 can be provided as a parallel circuit to thinning processing without any particular problem. That is, when thinning processing is controlled as in the above-described embodiments, generation of unprinted portions due to thinning can be suppressed even in a parallel circuit.

Other Embodiments

In the first to fourth embodiments, a black background area (or white background area) is determined based on line width information, and thinning processing is controlled. However, black pixels or white pixels within a rectangular range may be counted, and a black background area (or white background area) may be determined based on the number or ratio of pixels to switch thinning control.

The black background can be either a black area of a binary monochrome image or an area of a multilevel image where density is equal to or higher than a predetermined density. The white background can be either a white area of a binary monochrome image or an area of a multilevel image where density is equal to or lower than a predetermined density.

In the first to fourth embodiments, thinning processing is controlled in accordance with the state of a black background area. However, the thinning processing is not limited to processing of converting a pixel from black to white and may be processing of reducing pixel values. That is, the thinning processing may be density reduction processing of making the pixel values of a multivalued image smaller.

Only one counter may be provided for the lines and incremented for a black line or decremented for a white line. Whether an area adjacent to the line of interest is a black background area (or white background area) may be determined based on the state of the counter. The present invention is not limited to the above-described embodiments, and also includes image conversion for controlling thinning processing using black background area (or white background area) determination.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-237272, filed Oct. 26, 2012, which is hereby incorporated by reference herein in its entirety.

What is claimed is:

1. An image processing apparatus for processing image data to be used for image formation, comprising:
   at least one hardware processor; and
   at least one memory coupled to the at least one hardware processor and having stored thereon instructions which, when executed by the at least one hardware processor, cause the image processing apparatus to:
      determine a black background area formed from a plurality of black lines using the number of consecutive black lines and the number of consecutive lines adjacent to the black lines and other than the black lines out of the image data; and
      perform thinning processing for the black background area by switching a thinning pattern to convert a value of a pixel based on the number of lines included in the black background area determined in the black background area determining step.

2. The apparatus according to claim 1, wherein determining the black background area includes determining the consecutive black lines as the black background area in a case where the number of consecutive black lines is larger than a first threshold, and the number of consecutive lines following the consecutive black lines and other than the black lines is larger than a second threshold.

3. The apparatus according to claim 1, wherein performing thinning processing includes switching the thinning pattern used in the thinning processing between the black background area and an area other than the black background area.

4. The apparatus according to claim 3, wherein the thinning pattern applied to the black background area suppresses a ratio of pixels to be converted as compared to the thinning pattern applied to the area other than the black background area.

5. The apparatus according to claim 1, wherein performing thinning processing includes switching the thinning pattern applied to the black background area, a portion to use out of the applied thinning pattern, and a position to apply the thinning pattern in the black background area based on the number of lines included in the black background area.

6. The apparatus according to claim 1, wherein the at least one memory has stored thereon further instructions which, when executed by the at least one hardware processor, cause the image processing apparatus to:

apply second image processing other than thinning processing to the image data; and select a value to be used for image formation from a processing result of the image data in the thinning processing and the image processing.

7. The apparatus according to claim 6, wherein the second image processing includes at least one of smoothing processing, thickening processing, and toner save processing of the image data.

8. An image processing method of processing image data to be used for image formation, comprising:

determining a black background area formed from a plurality of black lines using the number of consecutive black lines and the number of consecutive lines adjacent to the black lines and other than the black lines out of the image data; and performing thinning processing for the black background area by switching a thinning pattern to convert a value of a pixel based on the number of lines included in the black background area determined in the black background area determining step.

9. A non-transitory computer-readable medium having stored thereon a computer program to cause a computer to perform a method, the method comprising:

determining a black background area formed from a plurality of black lines using the number of consecutive black lines and the number of consecutive lines adjacent to the black lines and other than the black lines out of image data; and performing thinning processing for the black background area by switching a thinning pattern to convert a value of a pixel based on the number of lines included in the black background area determined in the black background area determining step.

* * * * *